US009651953B2

(12) United States Patent
Essfeld et al.

(10) Patent No.: US 9,651,953 B2
(45) Date of Patent: May 16, 2017

(54) FLOW CONTROLLER

(71) Applicant: IMI Hydronic Engineering International SA, Eysins (CH)

(72) Inventors: Fritz Essfeld, Warstein (DE); Bernhard Henke, Brilon (DE); Carina Schmidt, Essen (DE); John Trantham, Hurst, TX (US)

(73) Assignee: IMI Hydronic Engineering International SA, Eysins (CH)

( * ) Notice: Subject to any disclaimer, the term of this patent is extended or adjusted under 35 U.S.C. 154(b) by 0 days.

(21) Appl. No.: 14/812,369

(22) Filed: Jul. 29, 2015

(65) Prior Publication Data
US 2016/0054740 A1    Feb. 25, 2016

(30) Foreign Application Priority Data
Aug. 19, 2014 (EP) ..................................... 14181388

(51) Int. Cl.
*G05D 7/01* (2006.01)
*F24D 19/10* (2006.01)
*F16K 1/52* (2006.01)

(52) U.S. Cl.
CPC .......... *G05D 7/014* (2013.01); *F24D 19/1015* (2013.01); *F16K 1/526* (2013.01); *F24D 2220/0264* (2013.01); *Y10T 137/7788* (2015.04)

(58) Field of Classification Search
CPC ......... Y10T 137/7782; Y10T 137/7787; Y10T 137/7788; G05D 7/0126; G05D 7/0133; G05D 7/014; F16K 1/526; F24D 19/1015; F24D 2220/0264

USPC .......................................... 137/495, 500, 501
See application file for complete search history.

(56) References Cited

U.S. PATENT DOCUMENTS 2,923,277 A * 2/1960 Waterman ............... F15B 11/13
 251/16
3,040,759 A * 6/1962 Kates .................... G05D 11/006
 137/111
3,100,620 A * 8/1963 Kates .................... G05D 7/0126
 137/501

(Continued)

FOREIGN PATENT DOCUMENTS

DE    10 2007 013505 A1    10/2008
DE    10 2009 033 376 A1    1/2011

(Continued)

*Primary Examiner* — William McCalister
(74) *Attorney, Agent, or Firm* — Muncy, Geissler, Olds & Lowe, P.C.

(57) ABSTRACT

A flow controller for a heating system with a housing, which has an inlet connection for a heating medium, an outlet connection for the heating medium, and a preadjustment connection, with a rate regulating module, and with a handle, which acts together with a movably disposed structural element of the rate regulating module to preadjust the flow. To change the preadjustment of the flow via the handle, an effective cross section of a first flow-through opening for the heating medium can be adjusted and to regulate the preadjusted flow of the heating medium, a sleeve of the rate regulating module and a cup of the rate regulating module are disposed axially movable to one another. The inflow to the rate regulating module occurs on an outer side via the first flow-through opening which is provided on the sleeve and upstream of the second flow-through opening.

15 Claims, 2 Drawing Sheets

(56) References Cited

U.S. PATENT DOCUMENTS

| | | | | |
|---|---|---|---|---|
| 3,115,891 A * | 12/1963 | Kimm | ............... | F16K 31/0658 137/495 |
| 3,223,115 A * | 12/1965 | Kates | ............... | G05D 7/0133 137/501 |
| 3,590,861 A * | 7/1971 | Chittenden | ............... | F16K 3/34 137/501 |
| 3,724,494 A * | 4/1973 | Alber | ............... | G05D 7/0133 137/501 |
| 4,074,693 A * | 2/1978 | Kates | ............... | G05D 7/014 137/454.6 |
| 4,129,624 A * | 12/1978 | Kates | ............... | B01F 5/04 261/76 |
| 4,147,177 A * | 4/1979 | Iwatsuki | ............... | G05D 7/014 137/504 |
| 4,250,915 A * | 2/1981 | Rikuta | ............... | G05D 7/0106 137/501 |
| 4,449,548 A * | 5/1984 | Tutherly | ............... | G05D 16/10 137/468 |
| 5,000,219 A * | 3/1991 | Taube, Sr. | ............... | G05D 7/0126 137/501 |
| 5,520,661 A * | 5/1996 | Lal | ............... | A61M 5/16881 137/843 |
| 5,642,752 A * | 7/1997 | Yokota | ............... | G05D 7/0106 137/413 |
| 5,806,558 A * | 9/1998 | Greverath | ............... | G05D 7/0126 137/501 |
| 6,254,576 B1 * | 7/2001 | Shekalim | ............... | A61M 5/16881 137/501 |
| 6,467,501 B1 * | 10/2002 | Geile | ............... | G05D 7/0133 137/454.5 |
| 6,598,618 B1 * | 7/2003 | Shay | ............... | A61M 5/16881 137/501 |
| 6,688,319 B2 * | 2/2004 | Trantham | ............... | F25B 41/062 137/2 |
| 6,932,107 B2 * | 8/2005 | Kirchner | ............... | F16K 31/363 137/501 |
| 7,647,942 B2 * | 1/2010 | Weston | ............... | F16K 3/26 137/454.6 |
| 7,735,514 B2 * | 6/2010 | Marstorp | ............... | F16K 1/526 137/501 |

FOREIGN PATENT DOCUMENTS

| | | |
|---|---|---|
| DE | 10 2010 032011 A1 | 1/2012 |
| DE | 10 2011 107273 A1 | 1/2013 |
| EP | 1 353 254 A2 | 10/2003 |
| WO | WO 2011/006559 A1 | 1/2011 |

* cited by examiner

FLOW CONTROLLER

This nonprovisional application claims priority under 35 U.S.C. §119(a) to European Patent Application No. EP 14181388.1, which was filed on Aug. 19, 2014, and which is herein incorporated by reference.

BACKGROUND OF THE INVENTION

Field of the Invention

The present invention relates to a preadjustable flow controller for a heating system with a housing, which has an inlet connection for a heating medium, an outlet connection for the heating medium, and a preadjustment connection, with a rate regulating module, which depending on a preadjustment and a pressure difference changes a flow for the heating medium, and with a handle, which acts together with a movably disposed structural element of the rate regulating module to preadjust the flow, whereby to change the preadjustment of the flow via the handle, an effective cross section of a first flow-through opening for the heating medium can be adjusted and whereby to regulate the preadjusted flow of the heating medium, a sleeve of the rate regulating module and a cup of the rate regulating module, which are provided spring-loaded to one another via a bias spring, are disposed axially movable to one another and depending on an axial position, which varies with the pressure difference, a cross section of a second flow-through opening for the heating medium can be changed.

Description of the Background Art

A generic flow controller is known from German patent application DE 10 2009 033 376. The flow controller provides that the flow of the heating medium is adjusted quantitatively via a rotatable handle associated with the preadjustment connection. To this end, a relative position is changed between a flow controller cup, through which the heating medium flows and which has a recess in a face side, and a cone engaging in each case in sections in the recess. To regulate the preadjusted flow volume, a sleeve disposed movable in regard to the cone and the cup is provided, whereby the relative movement occurs as a function of the pressure difference in the flow controller. The sleeve completely or partially releases a cross section of a flow-through opening for the heating medium via which the medium is supplied to the rate regulating module. The flow is increased or reduced with the change in the cross section of the first flow-through opening for the heating medium. As a result, there is a change in the pressure difference arising via the second flow-through opening formed between the cone and recess provided on the cup. The sleeve preloaded via a spring against the cup moves with the change in the pressure difference, so that a cross section of the first flow-through opening for the heating medium is adjusted to match the flow situation.

SUMMARY OF THE INVENTION

It is therefore an object of the present invention to provide a flow controller to be more compact and to make it possible to install it in a housing that only has a small installation space available.

To achieve the object, an embodiment of the invention provides that the inflow to the rate regulating module occurs on an outer side via the first flow-through opening which is provided on the sleeve and is provided upstream of the second flow-through opening based on a flow direction of the heating medium.

The particular advantage of the invention is that by providing the first flow-through opening on the outer side, in particular an axial length of the rate regulation module can be made smaller and therefore the installation space requirement for accommodating the rate regulating module decreases. It is achieved in this respect to construct the flow controller of the invention with a standard housing, which is routinely used within the scope of installing heating systems and is made, for example, in the shape of a T-piece. The compact design in this respect reduces the installation space requirement in the new installation of heating systems. Moreover, the conversion of existing heating systems and the first-time provision of a flow controller according to the invention in these existing systems are supported. It is achieved in particular to use the housing of a thermostatic valve and in addition to realize the flow rate control in this housing.

According to an exemplary embodiment of the invention, the handle acts together with a regulating insert disposed movable with respect to the sleeve. The effective cross section of the first flow-through opening is defined depending on a relative position of the sleeve and regulating insert. The regulating insert can be provided in particular rotatable with respect to the sleeve or the cup of the rate controlling module. The installation space requirement is advantageously reduced further, when the regulating insert is provided rotatable with respect to the sleeve or cup. In particular, the lack of an axial displacement makes the design of the rate controlling module very compact, because the rotation can be realized within an active space of the rate controlling module, said space being defined by the cup or sleeve. In particular, the installation space requirement or the size of the rate controlling module does not change as a function of the value of the flow volume preadjustment.

According to an embodiment of the invention, the regulating insert engages with a control section of the same in the sleeve. An inner cylindrical surface of the sleeve in this case lies flat against an outer cylindrical surface of the control section. In particular the control section of the regulating insert has a control contour which depending on a rotary position of the regulating insert completely releases the first flow-through opening for the hot medium or in any case covers it partially. The preadjustment for the flow volume of the heating medium then results depending on the rotary position. Advantageously, a very fine adjustment of the cross section of the first flow-through opening can be realized by providing the control contour and by the suitable geometric configuration of the same. The flow volume can be varied over a broad range in this regard and preadjusted precisely.

According to an embodiment of the invention, the sleeve can surround the cup on the outer side in each case in sections. The sleeve is provided in particular immovable and the cup is held axially movable in the sleeve. Advantageously the axial movement of the cup occurs relative to the sleeve within the active space of the rate regulating module. The compact design can be promoted further and it is possible to integrate the rate regulating module into a merely small installation space. The sleeve in this regard defines the volume for the active space of the rate regulating module. It has a substantial effect on the installation space requirement of the rate regulating module. The movably held cup in contrast is surrounded by the sleeve. It has no or at best a minor effect on the size and compactness of the rate regulating module.

The second flow-through opening provided for regulating the preadjusted flow, according to an embodiment of the invention, can be formed between the regulating insert and the cup. In particular, the second flow-through opening has the shape of an axial gap. The axial gap can be formed as a cylindrical annular gap, whereby the cylindrical annular gap has a constant axial width. The width of the axial gap and thereby the cross section of the second flow-through opening varies depending on the pressure conditions in the rate regulating module. The very sensitive regulation of the flow, preadjusted and defined by the cross section of the first flow-through opening, for the heating medium is achieved in this respect.

The regulating insert provides a supporting section for guiding the cup movable relative to the sleeve. The cup can be connected to the sleeve on the outer cylindrical side in the area of a first supporting site and to the supporting section of the regulating insert in the area of a second supporting site on the inner cylindrical side. The first supporting site and the second supporting site can be provided axially spaced apart from one another. Advantageously, a very compact design results by supporting the cup on the sleeve, on the one hand, and on the supporting section of the regulating insert, on the other. Moreover, a relative position of the cup to the sleeve results, on the one hand, and to the regulating insert, on the other. As a result, tolerances which may have a negative effect on the function of the flow controller are reduced or eliminated. Uniform flow conditions in the rate regulating module develop, moreover, which promote safe operation and reliability and counteract jamming of the cup.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
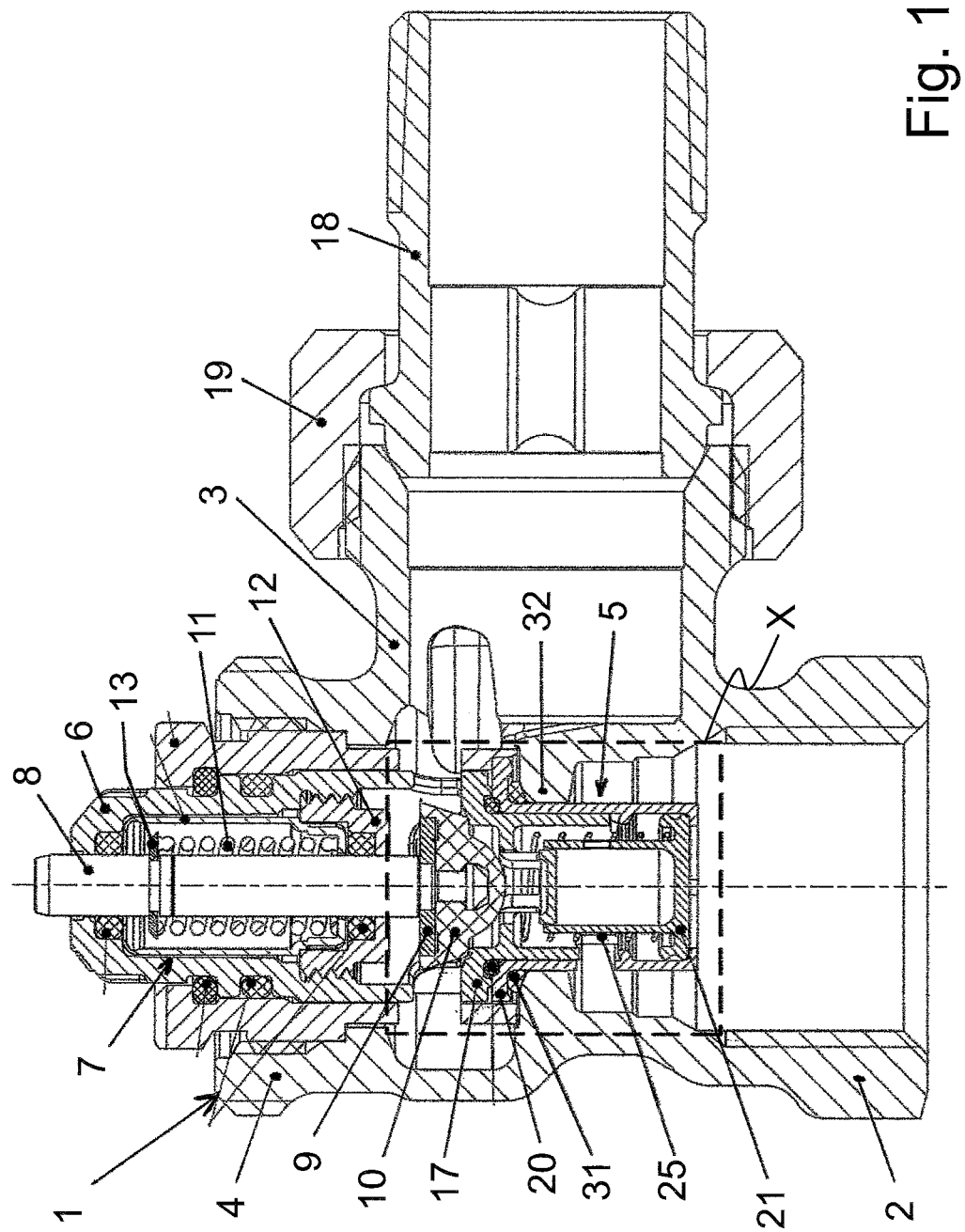
FIG. 1 shows a sectional illustration through a flow controller according to an exemplary embodiment of the invention, whereby a temperature control module of a temperature controller is provided in addition in a housing of the flow controller.

A flow controller for a heating system according to FIG. 1 comprises as essential components a housing 1 with an inlet connection 2 for a heating medium, with an outlet connection 3, and with a preadjustment connection 4, as well as a rate regulating module 5 and a handle 6. A flow volume for the heating medium is changed with use of rate regulating module 5. The change in the flow volume occurs as a function of a preadjustment of rate regulating module 5 and a pressure difference. The preadjustment is made via handle 6.

Further, a temperature control module 7 of a temperature controller is provided in housing 1 of the flow controller. Temperature control module 7 comprises in particular a sensor pin 8 which is coupled to a temperature transmitter (not shown) and at whose end, facing rate regulating module 5, a plate 9 and a seal 10 retained at plate 9 are provided. Depending on a specified temperature and a temperature detected by the temperature sensor, sensor pin 8 is longitudinally actuated and the flow of the heating medium is varied as a result of the actuation of sensor pin 8 by plate 9 and seal 10 attached thereto. The actuation of sensor pin 8 occurs in this case against a pressure spring 11. Pressure spring 11 rests on a locking piece 12 of temperature control module 7 and is tensioned against a retaining ring 13 attached to sensor pin 8. Like the temperature sensor, a setting element for specifying a temperature value is disposed outside housing 1 and is not shown.

The heating medium is supplied via inlet connection 2 to housing 1 and rate regulating module 5 provided therein. It enters an active space 15 of rate regulating module 5 via a first flow-through opening 14. The heating medium further flows through a second flow-through opening 16 and enters the active space of temperature control module 7 placed downstream of rate regulating module 5 in the flow direction. Moreover, a pressure equalizing opening 33, via which the heating medium flows into cup 21, is formed on the outer side on cup 21. Because of pressure equalizing opening 33, the pressure in cup 21 corresponds to the pressure in active space 15.

In the present case, temperature control module 7 is completely closed. Plate 9 with seal 10 is placed against a valve seat formed by a regulating insert 17 of rate regulating module 5. Provided plate 9 with seal 10 is at a distance from regulating insert 17, a further flow-through opening for the heating medium forms between regulating insert 17 and seal 10. The heating medium enters the further pipes of the heating system (not shown) via the further flow-through opening, outlet connection 3, and a connecting nipple 18, which is attached via a nut 19 to outlet connection 3.

Figure 2:
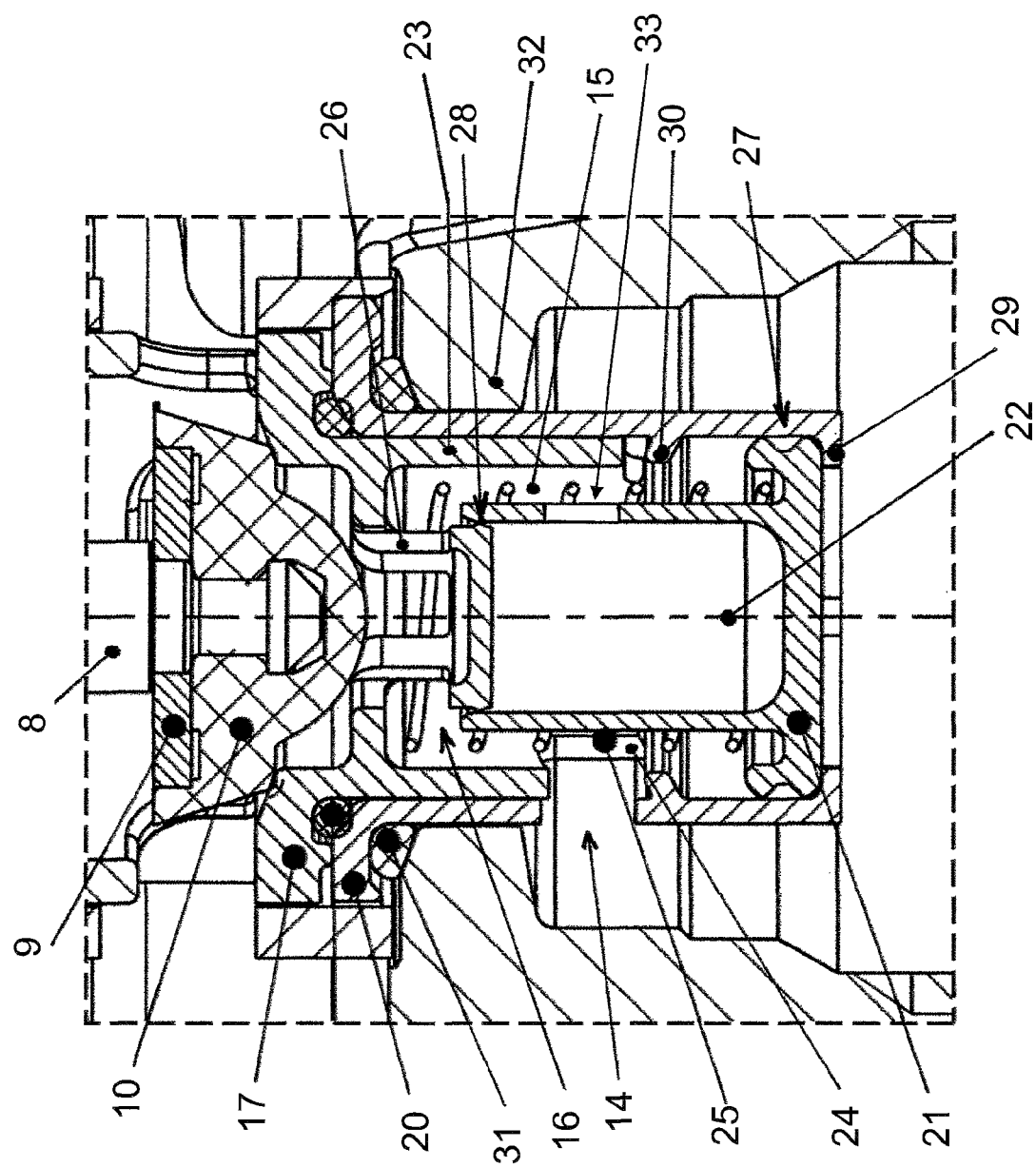
FIG. 2 shows a detail enlargement of a section X according to FIG. 1.

The function of rate regulating module 5 will be described hereafter, whereby reference is made in addition to the detail enlargement of section X, shown in FIG. 2. Rate regulating module 5 comprises as essential structural components a sleeve 20 having first flow-through opening 14, regulating insert 17 acting together with temperature control module 7, and a cup 21 held movable lengthwise in regard to sleeve 20 and regulating insert 17.

Regulating insert 17 is provided coaxial to sleeve 20 in regard to a longitudinal center axis 22 defined by a longitudinal axis of sensor pin 8. Regulating insert 17 protrudes with a control section 23 of the same in the area of a front side, facing temperature control module 7, of sleeve 20 into said sleeve. In this regard, an outer cylindrical surface of control section 23 lies against an inner cylindrical surface of sleeve 20. Regulating insert 17 acts together with handle 6 such that a rotation of handle 6 results in a relative rotation of regulating insert 17 with respect to sleeve 20. Longitudinal center axis 22 hereby at the same time forms a rotation axis for regulating insert 17. As a result of the rotation of regulating insert 17, a control contour 24, provided on control section 23 of regulating insert 17, moves partially, completely, or not at all over first flow-through opening 14 and releases it partially or completely or closes it. In this respect, a preadjusted flow for the heating medium results depending on a rotary position of regulating insert 17.

The heating medium entering active space 15 of rate regulating module 5 via first flow-through opening 14 flows around the longitudinally movable cup 21, held in sleeve 20, in the area of an outer cylinder surface of the same and flows through second flow-through opening 16. In this case, a pressure loss results which depends on the flow volume or the volumetric flow. As a result of the pressure loss, a pressure in the interior of cup 21 is lower than in the area of inlet connection 2. Whereas in active space 15 the pressure, reduced due to passage through first flow-through opening 14 which is variable in its size, prevails in the interior of cup 21, the pressure prevalent in inlet connection 2 acts on a bottom of cup 21. As a result of the pressure difference formed between the cup interior and inlet connection 2, cup 21 moves lengthwise relative to sleeve 20 and thereby reduces an effective cross section of second flow-through opening 16. As a result of the reduction of the flow cross section of the second flow-through opening, the flow declines and the pressure difference is reduced. Second flow-through opening 16 is formed in the manner of a ring-shaped cylindrical or axial gap. Axial gap 16 has a constant width in the axial direction.

Cup 21 is particularly preloaded by a bias spring 25. Bias spring 25 is tensioned further, when the cross section of second flow-through opening 16 becomes smaller.

To support cup 21, a support section 26 is formed on regulating insert 17 in the area of second flow-through opening 16. To guide cup 21 axially movable relative to sleeve 20, a first support site 27 is formed between sleeve 20 and cup 21 and a second support site 28 between cup 21 and support section 26 of regulating insert 17. Support sites 27, 28 are spaced apart in the direction of longitudinal center axis 22. An axial stroke of cup 21 is delimited in particular by a first stop 29, provided on the inner cylindrical side on sleeve 20, and optionally by a second stop 30, likewise provided on the inner cylindrical side of sleeve 20.

Handle 6, which is supported on sensor pin 8 of temperature control module 7, and is held rotatable in regard to sensor pint 8, has a bell shape and surrounds sensor pin 8 and parts of temperature control module 7 on the outer side. Locking piece 12 of temperature control module 7 is held on handle 6 via a thread. The transmission of the rotary movement of handle 6 to regulating insert 17 can occur in a positive locking manner.

When functionally necessary, various O-rings are provided as seals between adjacent structural elements on the flow controller. The position of the different O-rings will not be discussed in greater detail here. Flow controller components adjacent to the O-rings can be disposed fixed and/or movable relative to one another, particularly longitudinally movable or rotatable. In particular, an O-ring 31 is provided between sleeve 20 and a connecting section 32 which is formed on housing 1 and supports sleeve 20. O-ring 31 provided between connecting section 32 and sleeve 20 serves to separate the inlet side of the heating system, associated with inlet connection 2, from the outlet side of the heating system, associated with outlet connection 3.

Similar structural elements and structural element functions are labeled with the same reference characters.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:
1. A preadjustable flow controller for a heating system comprising:
a housing that has an inlet connection for a heating medium, an outlet connection for the heating medium, and a preadjustment connection;
a rate regulating module, which depending on a preadjustment and a pressure difference changes a flow for the heating medium; and
a handle that acts together with the rate regulating module to preadjust the flow,
wherein, to change the preadjustment of the flow via the handle, an effective cross section of a first flow-through opening for the heating medium is adjusted,
wherein, to regulate the preadjusted flow of the heating medium, a sleeve of the rate regulating module and a cup of the rate regulating module, which are provided spring-loaded to one another via a bias spring, are disposed axially movable to one another and depending on an axial position, which varies with the pressure difference, a cross section of a second flow-through opening for the heating medium is changed,
wherein the inflow to the rate regulating module occurs via the first flow-through opening, which is provided through the sleeve and is provided upstream of the second flow-through opening based on a flow direction of the heating medium, and
the second flow-through opening is provided on an axial end the cup, thereby the inflow from the first flow-through opening passes on the outer cylindrical surface of the cup through the second flow-through opening.

2. The flow controller according to claim 1, wherein the rate regulation module includes a regulating insert, which is disposed movable in regard to the sleeve and which depending on a relative position of the sleeve and regulating insert defines the effective cross section of the first flow-through opening, the regulating insert acting together with the handle.

3. The flow controller according to claim 2, wherein the regulating insert is provided rotatable with respect to the sleeve and the cup.

4. The flow controller according to claim 2, wherein an axial association of the sleeve with the regulating insert is fixedly predetermined.

5. The flow controller according to claim 2, wherein the regulating insert engages with a control section in the sleeve and/or wherein an inner cylindrical surface of the sleeve lies flat against an outer cylindrical surface of the control section.

6. The flow controller according to claim 2, wherein a control contour, which depending on a rotary position of the regulating insert, completely releases the first flow-through opening or in any case partially covers it to preadjust the cross section of the first flow-through opening, is provided on the regulating insert in an area of the control section.

7. The flow controller according to claim 1, wherein the sleeve is provided immovable and wherein the cup is held axially movable.

8. The flow controller according to claim 1, wherein the sleeve surrounds the cup on an outer side thereof.

9. The flow controller according to claim 1, wherein the second flow-through opening effective for regulating the preadjusted flow and variable with respect to the cross section of the second flow-through opening, based on a flow direction of the heating medium, is provided between the first flow-through opening and the outlet connection.

10. The flow controller according to claim 2, wherein the cup is held axially movable on an inner cylindrical surface on the sleeve and on an outer cylindrical surface on a support section of the regulating insert.

11. The flow controller according to claim 2, wherein, for guiding the cup axially movable relative to the sleeve, a first support site formed between the sleeve and the cup, and a second support site formed between the cup and the regulating insert are provided.

12. The flow controller according to claim 2, wherein an axial gap between the regulating insert and the cup is formed as the second flow-through opening.

13. The flow controller according to claim 12, wherein the axial gap is formed as a cylindrical annular gap with a circumferentially identical width.

14. The flow controller according to claim 11, wherein the first support site and the second support site are provided axially spaced apart from one another.

15. The flow controller according to claim 11, wherein the rate regulating module includes a regulating insert coaxially provided between the sleeve and the cup, and the regulating insert includes a side wall formed in parallel with and spaced apart from an outer cylindrical surface of the cup, and an axially inwardly projection that overlaps with the axial end of the cup in an axial direction of the cup.

* * * * *